(12) United States Patent
Yoshida et al.

(10) Patent No.: US 11,817,547 B2
(45) Date of Patent: Nov. 14, 2023

(54) WOUND-TYPE BATTERY

(71) Applicant: Panasonic Intellectual Property Management Co., Ltd., Osaka (JP)

(72) Inventors: Masayoshi Yoshida, Osaka (JP); Oose Okutani, Hyogo (JP); Takeshi Enomoto, Osaka (JP); Akira Takano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 424 days.

(21) Appl. No.: 16/584,542

(22) Filed: Sep. 26, 2019

(65) Prior Publication Data

US 2020/0020923 A1 Jan. 16, 2020

Related U.S. Application Data

(63) Continuation of application No. PCT/JP2018/005420, filed on Feb. 16, 2018.

(30) Foreign Application Priority Data

Mar. 30, 2017 (JP) ................................. 2017-066792

(51) Int. Cl.
*H01M 10/0525* (2010.01)
*H01M 10/0587* (2010.01)
(Continued)

(52) U.S. Cl.
CPC ... *H01M 10/0525* (2013.01); *H01M 10/0587* (2013.01); *H01M 50/186* (2021.01);
(Continued)

(58) Field of Classification Search
CPC ............. H01M 50/538; H01M 50/172; H01M 10/0587; H01M 6/10; H01M 2006/106;
(Continued)

(56) References Cited

U.S. PATENT DOCUMENTS 9,105,890 B2 * 8/2015 Kim ..................... H01M 50/528
9,783,704 B2 * 10/2017 Fujii ...................... C09J 163/00
(Continued)

FOREIGN PATENT DOCUMENTS

CN 204333097 U 5/2015
JP 03-69857 U 7/1991
(Continued)

OTHER PUBLICATIONS

International Search Report dated May 1, 2018, issued in counterpart Application No. PCT/JP2018/005420. (2 pages).
(Continued)

*Primary Examiner* — Matthew W Van Oudenaren
(74) *Attorney, Agent, or Firm* — WHDA, LLP

(57) ABSTRACT

A wound-type battery includes a wound electrode group having a first electrode and a second electrode with polarity opposite to the first electrode, an electrolyte, a battery case, a sealing plate that seals an opening of the battery case, an insulating plate that is disposed between the electrode group and the sealing plate and that has a hole, and a first tab that passes through the hole to electrically connect the first electrode and the sealing plate to each other. At least a part of a region of the first tab that extends through the hole to a sealing plate side is covered with a tab tape on a side facing the insulating plate. The tab tape includes at least a first adhesive layer and a second adhesive layer on a side opposite the first adhesive layer and is in contact with the first tab through the first adhesive layer.

3 Claims, 3 Drawing Sheets

(51) Int. Cl.
*H01M 50/538* (2021.01)
*H01M 50/186* (2021.01)
*H01M 50/536* (2021.01)
*H01M 50/179* (2021.01)
*H01M 10/643* (2014.01)
*H01M 50/152* (2021.01)
*H01M 10/28* (2006.01)
*H01M 6/10* (2006.01)
*H01M 50/595* (2021.01)
*H01M 50/474* (2021.01)
*H01M 50/477* (2021.01)
*H01M 50/48* (2021.01)
*H01M 50/528* (2021.01)

(52) U.S. Cl.
CPC ............ *H01M 50/538* (2021.01); *H01M 6/10* (2013.01); *H01M 10/286* (2013.01); *H01M 10/643* (2015.04); *H01M 50/152* (2021.01); *H01M 50/179* (2021.01); *H01M 50/474* (2021.01); *H01M 50/477* (2021.01); *H01M 50/48* (2021.01); *H01M 50/528* (2021.01); *H01M 50/536* (2021.01); *H01M 50/595* (2021.01); *H01M 2006/106* (2013.01)

(58) Field of Classification Search
CPC .. H01M 10/286; H01M 10/643; H01M 50/15; H01M 50/148; H01M 50/152; H01M 50/179; H01M 50/471; H01M 50/474; H01M 50/477; H01M 50/48; H01M 50/483; H01M 50/486; H01M 50/50; H01M 50/569; H01M 50/528; H01M 50/531; H01M 50/533; H01M 50/534; H01M 50/536; H01M 50/595
See application file for complete search history.

(56) References Cited

U.S. PATENT DOCUMENTS

| | | |
|---|---|---|
| 2006/0073382 A1 | 4/2006 | Urano et al. |
| 2006/0216588 A1 | 9/2006 | Kim et al. |
| 2012/0202108 A1 | 8/2012 | Kim et al. |
| 2013/0157086 A1 | 6/2013 | Kawabe et al. |
| 2014/0154500 A1* | 6/2014 | Araki .................... C09J 7/22 428/317.3 |
| 2017/0133645 A1 | 5/2017 | Miyata et al. |
| 2018/0130994 A1 | 5/2018 | Yamaguchi et al. |

FOREIGN PATENT DOCUMENTS

| | | | |
|---|---|---|---|
| JP | 2006-100097 A | | 4/2006 |
| JP | 2012167247 | * | 9/2012 |
| JP | 2012167247 A | * | 9/2012 |
| JP | 2012-251143 A | | 12/2012 |
| JP | 2013-149603 A | | 8/2013 |
| WO | 2015/146078 A1 | | 10/2015 |
| WO | 2016/174811 A1 | | 11/2016 |

OTHER PUBLICATIONS

English Translation of Search Report dated Jul. 28, 2021, issued in counterpart CN Application No. 201880013710.4 (2 pages).

* cited by examiner

WOUND-TYPE BATTERY

TECHNICAL FIELD

The present invention relates to a wound-type battery including a wound electrode group.

BACKGROUND ART

A wound-type battery includes a wound electrode group, an electrolyte, a battery case that houses them, and a sealing plate that seals an opening of the battery case. An insulating plate is disposed between the electrode group and the sealing plate, and the insulating plate is provided with a hole for passing therethrough a tab extending from a positive electrode or a negative electrode included in the electrode group. One end of the tab extending from an electrode is pulled out through the hole in the insulating plate to the sealing plate side and connected to the bottom of the sealing plate (e.g., PTL 1). In the wound electrode group of the related art, an insulating protective tape is bonded to a part of the tab pulled out through the hole to the sealing plate side in order to provide insulation and also to reinforce the tab. As the protective tape of the related art, an adhesive tape having an adhesive layer formed on one side thereof has been used.

CITATION LIST

Patent Literature

PTL 1: International Publication No. 2015/146078

SUMMARY OF INVENTION

The protective tape may peel or slip off the tab during the process of producing a battery. When a protective tape of the related art is used, a portion of the tab tends to fall through the hole in the insulating plate to the electrode group side. If the tab falls to the electrode group side, the tab may come into contact with an electrode with a polarity opposite to that of the tab to cause internal short-circuiting.

A wound-type battery according to one aspect of the present disclosure includes a wound electrode group that includes a first electrode and a second electrode having a polarity opposite to that of the first electrode, an electrolyte, a battery case that houses the electrode group and the electrolyte, a sealing plate that seals an opening of the battery case, an insulating plate that is disposed between the electrode group and the sealing plate and that has a hole, a first tab that passes through the hole to electrically connect the first electrode and the sealing plate to each other, and a second tab that electrically connects the second electrode and the battery case to each other, at least a part of a region of the first tab that is pulled out through the hole to the sealing plate side is covered with a tab tape on a side facing the insulating plate, and
the tab tape includes at least a first adhesive layer on the first tab side and a second adhesive layer on the side opposite the first adhesive layer and is in contact with the first tab through the first adhesive layer.

If the protective tape that protects the tab extending from the electrode group peels or slips off in the wound-type battery, insulation of the tab can be ensured.

DESCRIPTION OF EMBODIMENTS

Figure 1:
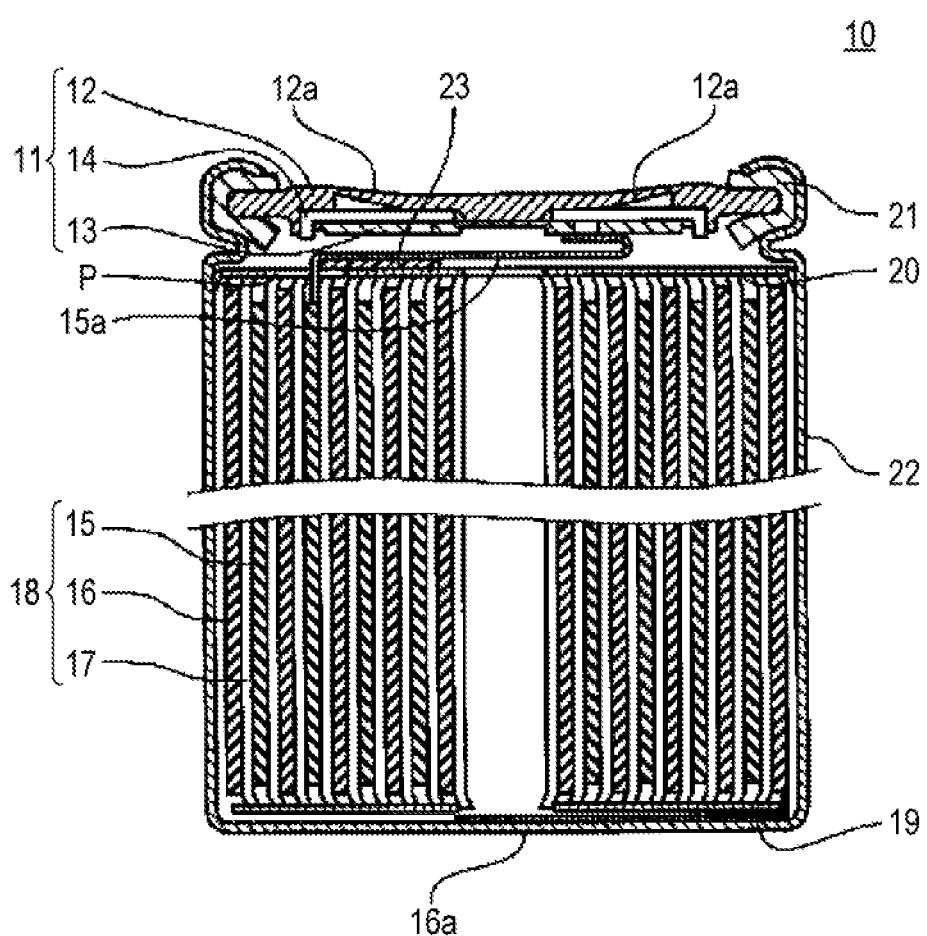
FIG. 1 is a longitudinal sectional view schematically illustrating a wound-type battery according to one embodiment of the present invention.

A wound-type battery according to one embodiment of the present invention includes a wound electrode group that includes a first electrode and a second electrode having a polarity opposite to that of the first electrode, an electrolyte, a battery case that houses the electrode group and the electrolyte, a sealing plate that seals an opening of the battery case, an insulating plate that is disposed between the electrode group and the sealing plate and that has a hole, a first tab that passes through the hole to electrically connect the first electrode and the sealing plate to each other, and a second tab that electrically connects the second electrode and the battery case to each other. At least a part of a region of the first tab that is pulled out through the hole to the sealing plate side is covered with a tab tape on a side facing the insulating plate. The tab tape includes at least a first adhesive layer on the first tab side and a second adhesive layer on the side opposite the first adhesive layer and is in contact with the first tab through the first adhesive layer.

The insulating plate (hereinafter also referred to as the first insulating plate) disposed between the electrode group and the sealing plate is provided with a hole for passing therethrough the first tab connecting the electrode group and the sealing plate to each other. In a battery of the related art, an insulating tab tape (or protective tape) for providing insulation and reinforcing the first tab is bonded to a portion of the first tab. An adhesive tape having on one side thereof an adhesive layer is used as the tab tape and bonded to the first tab through the adhesive layer. However, if heat and/or force is applied to the first tab and/or the tab tape during the process of producing a battery and/or during the use of the battery, the tab tape may peel or slip off the first tab. In this case, the first tab is likely to fall through the hole of the first insulating plate to the electrode group side, and the first tab may come into contact with the second electrode to cause internal short-circuiting.

In this embodiment, the tab tape for reinforcing the first tab includes a substrate layer and adhesive layers on opposite sides thereof. With this configuration, if the tab tape peels or slips off the first tab during the process of producing a battery and/or during the use of the battery, the tab tape tends to be secured in the vicinity of the hole because the second adhesive layer adheres to the first insulating plate. The tab tape in this state at least partially covering the hole of the first insulating plate inhibits the first tab from falling through the hole of the first insulating plate to the electrode group side. Thus, insulation of the first tab can be ensured. This can reduce the occurrence of internal short-circuiting which might otherwise be caused by contact between the first tab and the second electrode of the electrode group.

The tab tape is preferably disposed so as to cover at least a part of the hole (specifically, the hole through which the first tab passes) of the first insulating plate, and at least a part of the tab tape preferably faces the insulating plate. In this case, if the tab tape peels or slips off the first tab, at least a part of the hole of the first insulating plate is likely to be covered with the tab tape, and thus falling of the first tab through the hole is more easily inhibited. Thus, insulation of the first tab is more easily ensured.

The wound-type battery according to this embodiment will now be described more specifically by referring to the drawings as appropriate.

FIG. 1 is a schematic longitudinal sectional view of a wound-type battery according to one embodiment of the present invention. The wound-type battery illustrated is a cylindrical battery. A wound-type battery (hereinafter also referred to simply as a battery) 10 includes a wound electrode group (hereinafter also referred to simply as an electrode group) 18, an electrolyte (not shown), and a battery case (battery can) 22 that houses them. The electrode group 18 is formed by winding a positive electrode 15 serving as a first electrode and a negative electrode 16 serving as a second electrode with a separator 17 interposed therebetween. A ring-shaped groove is formed in the vicinity of an open end of the battery can 22.

An opening of the battery can 22 is sealed with a sealing plate 11 provided, around the periphery thereof, with a gasket 21. The sealing plate 11 includes a valve member 12 having a thin-walled portion 12a, a metal plate 13, and a ring-shaped insulating member 14 interposed between an outer peripheral portion of the valve member 12 and an outer peripheral portion of the metal plate 13. The valve member 12 and the metal plate 13 are connected to each other at their centers. A first tab 15a extending from the positive electrode 15 is connected to the metal plate 13. Thus, the valve member 12 functions as an external terminal of the positive electrode 15. A second tab 16a extending from the negative electrode 16 is connected to the inner surface of the bottom of the battery can 22. A first insulating plate 20 is disposed between the sealing plate 11 and one end of the electrode group 18. A second insulating plate 19 is disposed between the other end of the electrode group 18 and the bottom of the battery can 22.

Figure 2:
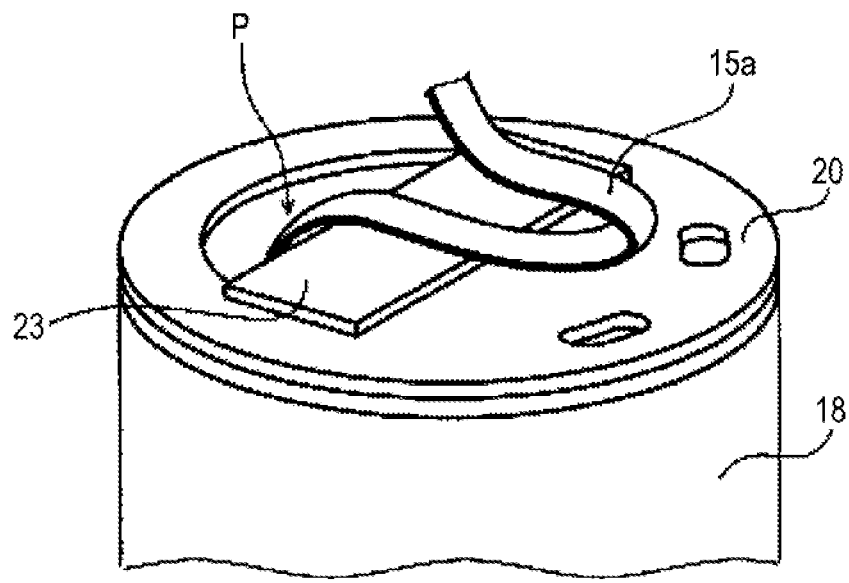
FIG. 2 is a schematic perspective view of an insulating plate and an electrode group viewed from above for explaining a state of a tab pulled out through a hole in the insulating plate and a tab tape protecting the tab.

FIG. 2 is a perspective view schematically illustrating a state of the first insulating plate and the electrode group viewed from above. FIG. 2 illustrates a state in which the first tab is pulled out through the hole of the first insulating plate.

The first tab 15a extending from the electrode group 18 is pulled out through a hole P in the first insulating plate 20 disposed on the upper side of the electrode group 18 to above the first insulating plate 20 (i.e., the side opposite the electrode group 18 or the sealing plate side). At least a part of a region of the first tab 15a that is pulled out through the hole P to the sealing plate side is covered with a tab tape 23 on a side facing the first insulating plate 20. To more effectively inhibit the first tab 15a from falling through the hole P, in the region of the first tab 15a that is pulled out through the hole P to the sealing plate side, at least the vicinity of the hole P is preferably covered with the tab tape 23.

Figure 3:
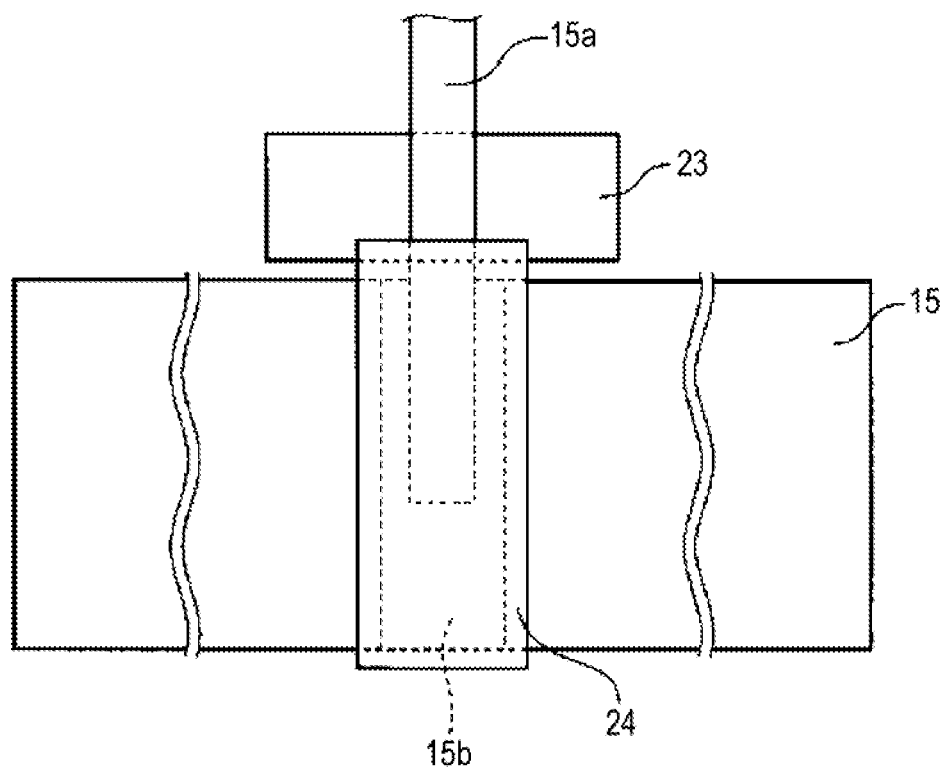
FIG. 3 is a plan view schematically illustrating a development of a positive electrode.

FIG. 3 is a plan view illustrating a development of the positive electrode, serving as a first electrode, included in the electrode group in FIG. 1 and FIG. 2. At a part of the positive electrode 15, an exposed area 15b where a current collector is exposed is formed. An end of the first tab 15a is connected to the exposed area 15b by, for example, welding. An insulating adhesive tape 24 is disposed so as to cover the exposed area 15b and the end of the first tab 15a. A part of the first tab 15a is covered with the tab tape 23 on the side opposite the adhesive tape 24. In assembling a battery, the first tab 15a extending from the positive electrode 15 is pulled out through the hole P of the first insulating plate 20 to the sealing plate side as illustrated in FIG. 2. When the electrode group 18 is formed, the positive electrode 15 is wound together with the negative electrode 16 serving as a second electrode and the separator 17 such that the tab tape 23 faces the first insulating plate 20. The adhesive tape 24 has on one side thereof an adhesive layer and is disposed such that the adhesive layer comes into contact with the exposed area 15b. In the illustrated example, the adhesive tape 24 and the tab tape 23 are disposed on opposite sides of the first tab 15a; alternatively, the adhesive tape 24 and the tab tape 23 may be bonded to the same side of the first tab 15a. In this case, the adhesive tape 24 and the tab tape 23 may be integrated with each other. The adhesive tape 24 in FIG. 3 is omitted in FIG. 1 and FIG. 2.

Although the first electrode may be a positive electrode or a negative electrode, the first electrode is often a positive electrode as illustrated. When the first electrode is a positive electrode, the second electrode is a negative electrode.

Figure 4:
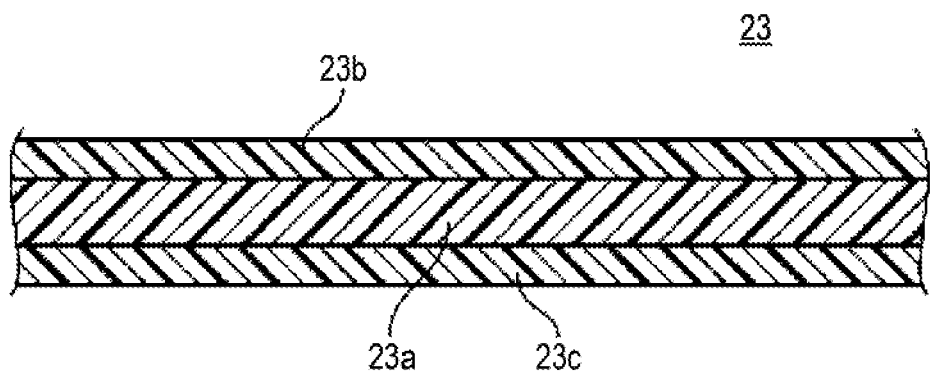
FIG. 4 is a longitudinal sectional view schematically illustrating the tab tape.

FIG. 4 is a schematic longitudinal sectional view of the tab tape illustrated in FIG. 2 and FIG. 3. The tab tape 23 illustrated includes a substrate layer 23a, a first adhesive layer 23b formed on one surface of the substrate layer 23a, and a second adhesive layer 23c formed on the other surface. The tab tape 23 is disposed so as to be in contact with the first tab through the first adhesive layer 23b. At this time, the second adhesive layer 23c faces the first insulating plate side. With this configuration, the tab tape 23 is likely to be adhering to the first insulating plate 20 through the second adhesive layer 23c if the tab tape 23 peels or slips off the first tab 15a during the process of producing a battery and/or during the use of the battery. The first adhesive layer 23b of the tab tape 23 adhering to the first insulating plate 20 faces the first tab 15a, and thus the first tab 15a tends to read here to or be caught by the first adhesive layer 23b. Thus, the first tab 15a is less likely to fall or slip down through the hole P. At this time, the tab tape 23 is preferably disposed so as to cover at least a part of the hole P, and at least a part of the tab tape 23 preferably faces the first insulating plate 20. In this case, the opening area of the hole P is reduced by the tab tape 23, and at the same time, the tab tape 23 tends to adhere to the first insulating plate 20 when the tab tape 23 peels or slips off the first tab 15a. Thus, the effect of inhibiting falling and slipping of the first tab 15a through the hole P to the electrode group 18 side is further increased.

The wound-type battery according to this embodiment will now be described in more detail.

Tab Tape 23

The tab tape 23 need only include at least the first adhesive layer 23b disposed on the first tab 15a side and the second adhesive layer 23c on the side opposite the first adhesive layer 23b. Although the substrate layer 23a is not essential, from the viewpoint of strength and the like, it is preferable to use the tab tape 23 in which the first adhesive layer 23b and the second adhesive layer 23c are formed on opposite surfaces of the substrate layer 23a.

The substrate layer 23a may be made of any material, but is preferably made of, for example, a polymer. Examples of polymers include cellulose derivatives (e.g., cellulose ether and cellulose ester), polyvinyl chloride, polyolefins (e.g., polyethylene and polypropylene), polystyrene, polyesters (e.g., polyethylene terephthalate), polyimide, polyamide, polycarbonate, and polyphenylene sulfide. The substrate layer 23a may contain one of these polymers or may contain two or more of them in combination. The substrate layer 23a may be stretched, if necessary.

To easily ensure the strength of the tab tape 23, the thickness of the substrate layer 23a is, for example, 8 μm or more and 50 μm or less, preferably 12 μm or more and 25 μm or less.

The first adhesive layer 23b can be formed, for example, of a known adhesive. Examples of adhesives include acrylic adhesives, rubber adhesives, silicone adhesives, and urethane adhesives. The first adhesive layer 23b may contain one of these adhesives or, if necessary, may contain two or more of them.

The first adhesive layer 23b preferably has adhesion when the tab tape 23 is bonded to the first tab 15a. The glass transition point (Tg) of such a first adhesive layer 23b is preferably 60° C. or lower, more preferably −70° C. or higher and 50° C. or lower. When the Tg of the adhesive has is in this range, the tab tape 23 is easily bonded to the first tab 15a.

The second adhesive layer 23c may be formed of a known adhesive. The adhesive can be selected from those described as examples for the first adhesive layer 23b. To increase the efficiency in bonding to the first tab 15a, the second adhesive layer 23c may be formed of such a material that adhesion of the second adhesive layer 23c are activated by applying thermal energy or light energy to the tab tape 23 after the tab tape 23 is bonded. Such a second adhesive layer 23c is preferably a curable resin composition. The curable resin composition constituting the second adhesive layer 23c may be cured while adhering to the first insulating plate 20 in the battery. That is to say, the second adhesive layer 23c may be a cured product of the curable resin composition. The cured product also encompasses a curable resin composition in a semi-cured state. The curable resin composition may be a photo-curable resin composition but is preferably a thermosetting resin composition. When the tab tape 23 is bended to the first tab 15a, the second adhesive layer 23c preferably has low adhesion, preferably exhibits substantially no adhesion.

The curable resin composition used to form the second adhesive layer 23c contains, for example, a curable resin and a curing agent. The curable resin composition may be of one-component type or two-component type. According to the type of curable resin, the curing agent also contains a polymerization initiator, a crosslinking agent, and the like. The curable resin composition may contain a solvent such as water or an organic solvent, if necessary. The curable resin composition may also contain an additive such as a curing accelerator, if necessary. Examples of curable resins include acrylic resins, rubber resins, silicone resins, urethane resins, epoxy resins, phenol resins, ester resins, and melamine resins. Specifically, the curable resin is, for example, a monomer, an oligomer, and/or a prepolymer of these resins. By applying light energy or thermal energy to a coating of the curable resin composition the monomer, the oligomer, and/or the prepolymer is polymerized and/or crosslinked under the action of the curing agent to cause curing, thereby forming the second adhesive layer 23c in the form of a cured product. When a component having a relatively low molecular weight, such as a monomer, is contained in a large amount, the coating of the curable resin composition may exhibit conductivity, albeit only slightly. By curing the curable resin composition, the second adhesive layer 23c having insulating properties is formed. Thus, the tab tape 23 is more easily provided with insulating properties. For example, visible light and/or ultraviolet light is used as the light energy. When thermal energy is applied, it is only required that at least the tab tape 23 be heated, or the entire battery or the vicinity of the sealing plate may be heated.

The glass transition point (Tg) of the second adhesive layer may be in the range described for the Tg of the first adhesive layer 23b. Alternatively, the Tg of the second adhesive layer 23c may be, for example, 40° C. or higher and 100° C. or lower, or 50° C. or higher and 70° C. or lower.

The thickness of the tab tape 23 is, for example, 10 μm or more and 200 μm or less, preferably 10 μm or more and 50 μm or less. A thickness of the tab tape 23 in this range provides an advantage in that the volume occupied by the tab tape in the battery is low, while the strength sufficient for supporting the first tab can be ensured.

The length of the tab tape 23 in a direction along the length direction of the first tab 15a can be appropriately selected according to, for example, the size of the hole P, but to easily ensure insulation of the first tab 15a, the length is preferably 1 mm or more and 8 mm or less, more preferably 2 mm or more and 3 mm or less.

The length of the tab tape 23 in a direction perpendicular to the length direction of the first tab 15a (hereinafter also referred to as the width of the tab tape) can be appropriately selected according to, for example, the size of the hole P. The width of the tab tape 23 is preferably 3 mm or more and 10 mm or less, more preferably 4 mm or more and 6 mm or less. When the width of the tab tape 23 is in this range, falling of the tab tape 23 through the hole P to the electrode group side is easily inhibited.

Other Components

Components other than the tab tape of the wound-type battery will now be described more specifically in the context of a lithium-ion secondary battery.

The positive electrode 15 includes a positive electrode current collector in foil form and a positive electrode active material layer formed on a surface thereof. As a material for the positive electrode current collector, aluminum, an aluminum alloy, stainless steel, titanium, a titanium alloy, or the like can be used. As the positive electrode active material, a lithium transition metal composite oxide is preferably used. For example, a composite oxide containing lithium and at least one selected from the group consisting of cobalt, manganese, nickel, chromium, iron, and vanadium is used.

The negative electrode 16 includes a negative electrode current collector in foil form and a negative electrode active material layer formed on a surface thereof. As a material for the negative electrode current collector, copper, a copper alloy, nickel, a nickel alloy, stainless steel, or the like can be used. As the negative electrode active material, a carbon material capable of reversibly intercalating and deintercalating lithium ions, such as natural graphite, artificial graphite, hard carbon, soft carbon, tin oxide, or silicon oxide, can be used.

As the separator 17, for example, a microporous membrane formed of a polyolefin can be used. Examples of polyolefins include polyethylene, polypropylene, and ethylene-propylene copolymers.

The electrolyte contains a non-aqueous solvent and a lithium salt dissolved in the non-aqueous solvent. As the non-aqueous solvent, a cyclic carbonate such as ethylene carbonate, propylene carbonate, or butylene carbonate; a linear carbonate such as dimethyl carbonate, diethyl carbonate, or ethyl methyl carbonate; a carboxylic acid ester; a linear ether; or the like is used. As the lithium salt, $LiPF_6$, $LiBF_4$, $LiClO_4$, or the like is used.

Examples of materials for the battery can 22 include, but are not limited to, iron, iron alloys, stainless steel, aluminum, and aluminum alloys.

When the first electrode is a positive electrode, the material of the first tab 15a is, for example, aluminum or an aluminum alloy. When the first electrode is a negative electrode, the material of the first tab 15a is, for example, aluminum, an aluminum alloy, nickel, or a nickel alloy. When the second electrode is a positive electrode, the material of the second tab 16a is, for example, aluminum or an aluminum alloy. When the second electrode is a negative electrode, the material of the second tab 16a is, for example, aluminum, an aluminum alloy, nickel, or a nickel alloy.

The first insulating plate 20 can be formed of, for example, an insulating resin or an insulation-treated metal. Examples of insulating resins include curable resins (e.g., thermosetting resins) such as phenol resins, epoxy resins, polyimide resins, polyamide-imide resins, polyetherimide resins, and thermosetting polyester resins and thermoplastic resins such as polyphenylene sulfide resins and fluorocarbon resins (e.g., polytetrafluoroethylene). Examples of metals include stainless steel and iron. The insulation treatment of a metal can be performed, for example, by coating the metal with an insulating resin. Examples of insulating resins for coating metals include, but are not limited to, polyimide resins and polypropylene resins. The first insulating plate may be formed of a material obtained by impregnating an insulating fibrous core such as a glass fiber with an insulating resin (e.g., a thermosetting resin such as a phenol resin), followed by curing.

The material of the second insulating plate is not particularly limited and may be selected from those described as examples for the first insulating plate. As the second insulating plate, a material may be used that contains an insulating resin, such as polypropylene or an epoxy resin, as the principal component and an insulating fibrous material as a core.

The wound-type battery 10 is not limited to the cylindrical battery as illustrated and may be, for example, a prismatic battery including a wound electrode group having oval end faces.

INDUSTRIAL APPLICABILITY

According to the wound-type battery according to the present invention, insulation of the tab extending from the electrode group to the sealing plate side is easily ensured. Thus, the wound-type battery according to the present invention can be applied to various wound-type batteries in each of which a tab extending from a wound electrode group is connected to a sealing plate.

REFERENCE SIGNS LIST 10 wound-type battery
11 sealing plate
12 valve member
12a thin-walled portion
13 metal plate
14 insulating member
15 positive electrode
15a first tab
15b current collector exposed area
16 negative electrode
16a second tab
17 separator
18 electrode group
19 second insulating plate
20 first insulating plate
21 gasket
22 battery case (battery can)
23 tab tape
23a substrate layer
23b first adhesive layer
23c second adhesive layer
24 adhesive tape
P hole of first insulating plate

The invention claimed is:

1. A wound-type battery comprising: a wound electrode group that includes a first electrode and a second electrode having a polarity opposite to that of the first electrode; an electrolyte; a battery case that houses the electrode group and the electrolyte; a sealing plate that seals an opening of the battery case; an insulating plate that is disposed between the electrode group and the sealing plate and that has a hole; a first tab that passes through the hole to electrically connect the first electrode and the sealing plate to each other; and a second tab that electrically connects the second electrode and the battery case to each other, wherein at least a part of a region of the first tab that extends through the hole to a sealing plate side is covered with a tab tape on a side facing the insulating plate, and the tab tape includes at least a first adhesive layer on a first tab side and a second adhesive layer on a side opposite the first adhesive layer and is in contact with the first tab through the first adhesive layer, wherein the second adhesive layer comprises a curable resin composition or a cured product thereof, wherein the curable resin composition is a thermosetting resin composition, and wherein a thickness of the tab tape is 10 μm or more and 200 μm or less.

2. The wound-type battery according to claim 1, wherein the second adhesive layer has insulating properties.

3. A wound-type battery comprising: a wound electrode group that includes a first electrode and a second electrode having a polarity opposite to that of the first electrode; an electrolyte; a battery case that houses the electrode group and the electrolyte; a sealing plate that seals an opening of the battery case; an insulating plate that is disposed between the electrode group and the sealing plate and that has a hole; a first tab that passes through the hole to electrically connect the first electrode and the sealing plate to each other; and a second tab that electrically connects the second electrode and the battery case to each other, wherein at least a part of a region of the first tab that extends through the hole to a sealing plate side is covered with a tab tape on a side facing the insulating plate, and the tab tape includes at least a first adhesive layer on a first tab side and a second adhesive layer on a side opposite the first adhesive layer and is in contact with the first tab through the first adhesive layer, wherein the tab tape is disposed so as to cover at least a part of the hole, and at least a part of the tab tape faces the insulating plate, wherein the second adhesive layer comprises a curable resin composition or a cured product thereof, wherein the curable resin composition is a thermosetting resin composition, and wherein a thickness of the tab tape is 10 μm or more and 200 μm or less.

* * * * *